(12) United States Patent
Ochiai et al.

(10) Patent No.: US 7,270,606 B2
(45) Date of Patent: Sep. 18, 2007

(54) POWER TRANSMISSION DEVICE

(75) Inventors: Yoshihiro Ochiai, Isesaki (JP); Atsushi Ozawa, Isesaki (JP)

(73) Assignee: Sanden Corporation, Gunma (JP)

( * ) Notice: Subject to any disclaimer, the term of this patent is extended or adjusted under 35 U.S.C. 154(b) by 91 days.

(21) Appl. No.: 11/108,839

(22) Filed: Apr. 19, 2005

(65) Prior Publication Data

US 2005/0230208 A1 Oct. 20, 2005

(30) Foreign Application Priority Data

Apr. 20, 2004 (JP) ............... 2004-124502

(51) Int. Cl.
F16D 3/00 (2006.01)
(52) U.S. Cl. .............. 464/85; 464/73; 464/76
(58) Field of Classification Search ........... 464/35, 464/36, 73, 76, 84, 85; 474/69, 17, 152; 192/56.1, 38, 209, 205
See application file for complete search history.

(56) References Cited

U.S. PATENT DOCUMENTS 3,438,221 A * 4/1969 Paulsen .............. 464/76
3,940,947 A * 3/1976 Ahlen ............... 464/85
6,080,066 A * 6/2000 Rastegar ............ 464/73

FOREIGN PATENT DOCUMENTS

JP 2002 065595 3/2002

* cited by examiner

Primary Examiner—Aaron Dunwoody
(74) Attorney, Agent, or Firm—Baker Botts L.L.P.

(57) ABSTRACT

A power transmission device prevents vibration in a rotation direction and collision noise, even if a shock absorbing rubber is permanently deformed in a compression direction. Specifically, even if compression forces repeatedly applied to a shock absorbing rubber causes the shock absorbing rubber to be permanently deformed in a compression direction, an elastic member placed between the shock absorbing rubber and each protrusion presses circumferentially the shock absorbing rubber of a pulley and a transmission ring, and therefore, a shock of an abrupt rotation number change caused by rattling between the shock absorbing rubber and the transmission ring may be absorbed by the elastic member, and vibration in a rotation direction and collision noise may be prevented.

5 Claims, 6 Drawing Sheets

POWER TRANSMISSION DEVICE

BACKGROUND OF THE INVENTION

1. Field of the Invention

The present invention relates to a power transmission device used in, for example, a compressor in a vehicle air conditioning device.

2. Description of the Related Art

A generally known compressor used in a vehicle air conditioning device includes a hollow compressor body, a compression section that compresses a fluid sucked into the compressor body, and a drive shaft connected to the compression section, and is adapted so that the drive shaft is rotated by power of an engine to drive the compression section and suck and discharge refrirerant.

A known power transmission device provided in the compressor includes a pulley rotated by power from an engine, a transmission member rotated by the pulley, and a hub connected to the transmission member via a torque limiter, and is adapted so that a plurality of protrusions provided in the pulley and the transmission member so as to be circumferentially spaced apart and axially protrude face circumferentially each other, a block-shaped shock absorbing rubber is placed between each protrusion of the pulley and each protrusion of the transmission member, and torque of the pulley is transmitted to the transmission member via each shock absorbing rubber (for example, see Japanese Patent Publication No. 2001-65595).

For the power transmission device, when a rotation number change occurs between the pulley and the transmission member, the torque of the pulley is transmitted to the transmission member while the shock absorbing rubber between the protrusions is elastically deformed in a compression direction to absorb a shock, but compression forces repeatedly applied to the shock absorbing rubber may cause the shock absorbing rubber to be permanently deformed in the compression direction, thereby creating a clearance between the shock absorbing rubber and each protrusion. Thus, in the case where power is transmitted from a drive source such as an automobile engine where periodical rotation number changes occur, the clearance may cause vibration in a rotation direction or collision noise, or an inertial force of the transmission member in a rotation area that is not subjected to shock absorbing action of the shock absorbing rubber may cause an excessive shock on the transmission member at the time of an abrupt rotation number change.

SUMMARY OF THE INVENTION

The invention is achieved in view of the above described problems, and has an object to provide a power transmission device that causes no vibration in a rotation direction and collision noise even if a shock absorbing rubber is permanently deformed in a compression direction.

In order to achieve the object, the invention provides a power transmission device including: a drive rotor rotated by external power; and a driven rotor rotated by the drive rotor, a plurality of protrusions provided in the drive rotor and the driven rotor so as to be circumferentially spaced apart and axially protrude facing circumferentially each other, a block-shaped shock absorbing rubber being placed between each protrusion of the drive rotor and each protrusion of the driven rotor, and torque of the drive rotor being transmitted to the driven rotor via each shock absorbing rubber, wherein an elastic member that presses the shock absorbing rubber circumferentially of the drive rotor and the driven rotor is provided between the shock absorbing rubber and the protrusion.

Thus, even if the shock absorbing rubber is permanently deformed in a compression direction, the elastic member placed between the shock absorbing rubber and the protrusion urges the shock absorbing rubber circumferentially of the drive rotor and the driven rotor, and therefore, a shock of an abrupt rotation number change caused by rattling between the shock absorbing rubber and the drive rotor or between the shock absorbing rubber and the driven rotor is absorbed by the elastic member. Thus, vibration in a rotation direction and collision noise can be reliably prevented.

BRIEF DESCRIPTION OF THE DRAWINGS

FIGS. 8A and 8B are front views, partially in section, of states of an elastic member before and after engagement according to another embodiment of the invention.

DESCRIPTION OF THE PREFERRED EMBODIMENTS

Figure 1:
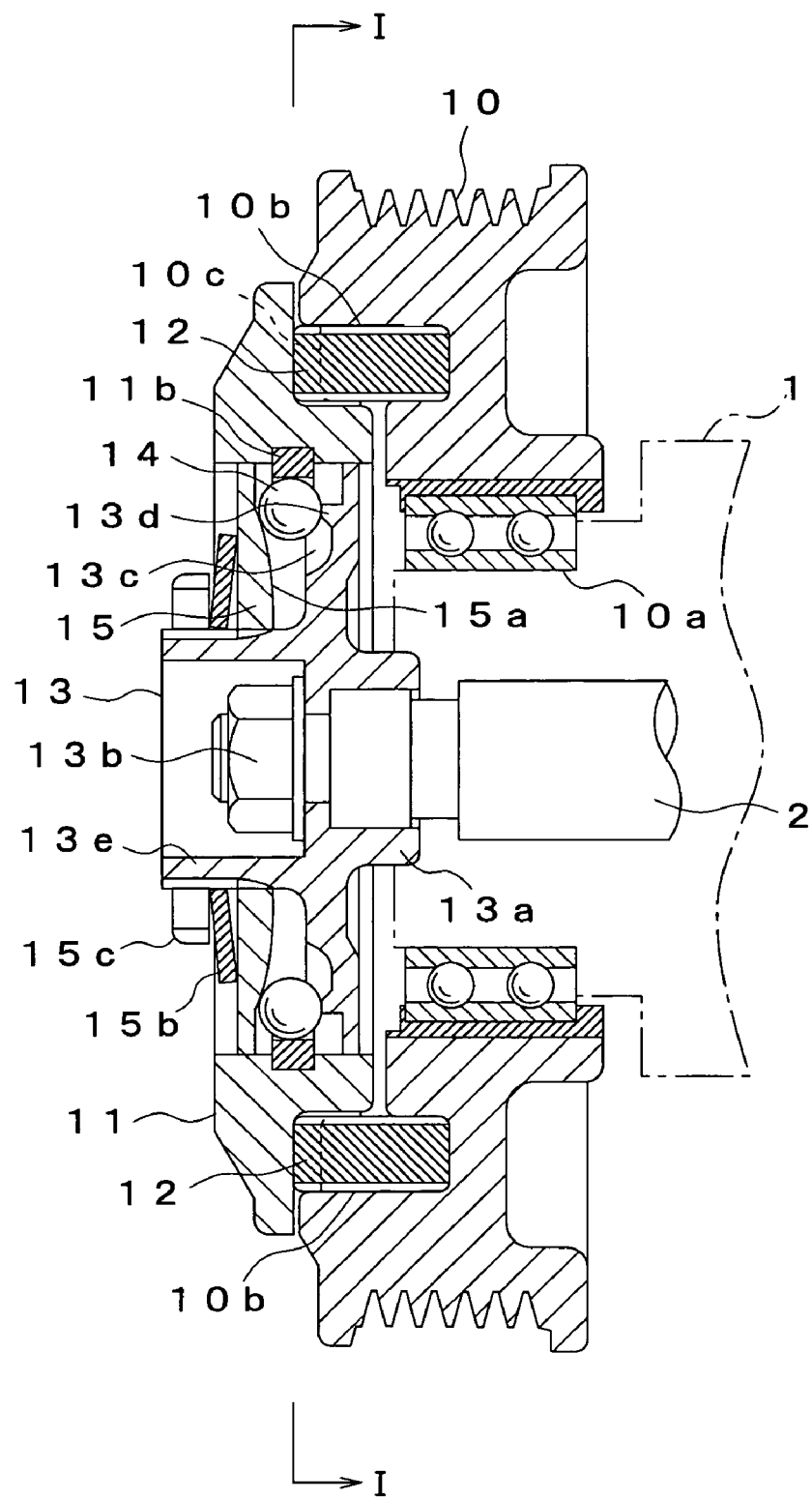
FIG. 1 is a side sectional view of a power transmission device according to an embodiment of the invention.
Figure 2:
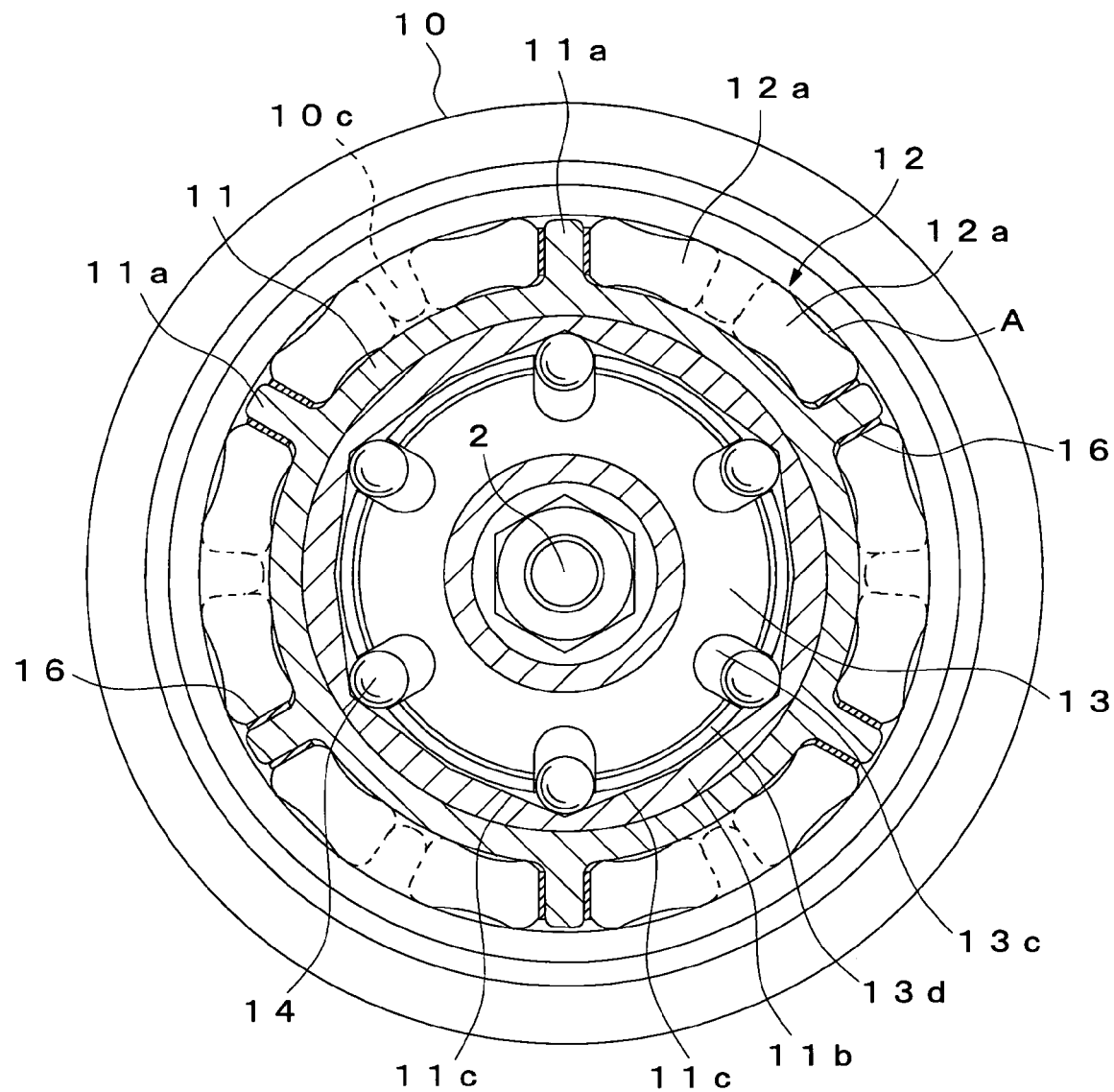
FIG. 2 is a sectional view taken along the line I-I in FIG. 1, looking in the direction of the arrows.
Figure 3:
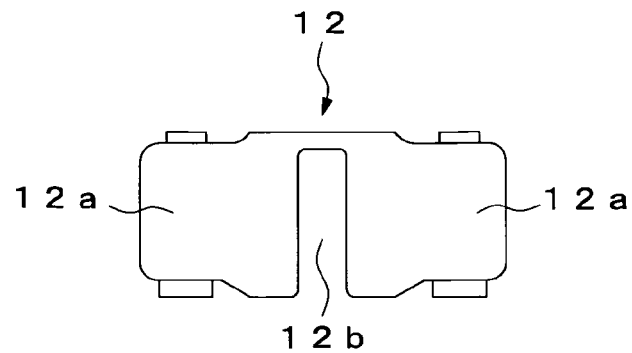
FIG. 3 is a front view of a shock absorbing rubber.

FIGS. 1 to 7 show an embodiment of the invention, and a power transmission device in FIGS. 1 to 7 is used in a compressor in a vehicle air conditioning device, and transmits power to a drive shaft 2 protruding from one end of a compressor body 1.

The power transmission device according to the embodiment includes a pulley 10 as a drive rotor rotated by external power, a transmission ring 11 as a driven rotor rotated by the pulley 10, a plurality of shock absorbing rubbers 12 that transmit torque of the pulley 10 to the transmission ring 11, a hub 13 connected to the drive shaft 2, a plurality of balls 14 that transmit torque of the transmission ring 11 to the hub 13, a pressing ring 15 that axially presses each ball 14, and a plurality of elastic members 16 that press the shock absorbing rubbers 12 circumferentially of the pulley 10 and the transmission ring 11.

The pulley 10 is adapted so that an unshown V belt is wound around an outer peripheral surface of the pulley 10, and the pulley 10 is rotatably supported by the compressor body 1 via a bearing 10a placed between an inner peripheral surface of the pulley 10 and the compressor body 1. Annular grooves 10b extending circumferentially are provided in one end surface of the pulley 10, and a plurality of protrusions 10c that are circumferentially spaced apart and axially protrude are provided in the grooves 10b.

The transmission ring 11 is placed so that one end surface thereof faces the one end surface of the pulley 10, and a plurality of protrusions 11a that are circumferentially spaced apart and axially protrude are provided in the surface facing the pulley 10. The protrusions 11a are inserted into the grooves 10b in the pulley 10, the protrusions 11a and the protrusions 10c of the pulley 10 are circumferentially alternately placed, and the protrusions 11a face the protrusions 10c of the pulley 10 in a circumferentially spaced-apart manner. A locking ring 11b that locks each ball 14 from outside in a diametrical direction is mounted to an inner peripheral surface of the transmission ring 11. A plurality of taper surfaces 11c that form a predetermined angle between adjacent ones are formed in an inner peripheral surface of the locking ring 11b, and each ball 14 abuts against an adjacent taper surface 11c to be placed outside in the diametrical direction.

Each shock absorbing rubber 12 is formed into a block shape, and is placed between the protrusion 10c of the pulley 10 and the protrusion 11a of the transmission ring 11. Each shock absorbing rubber 12 is constituted by a pair of shock absorbing portions 12a placed on both circumferential sides of the protrusion 10c of the pulley 10, and has a notch 12b that receives the protrusion 10c between the shock absorbing portions 12a. Each shock absorbing portion 12a has substantially the same width as the groove 10b of the pulley 10, and is formed to be curved along the groove 10b.

The hub 13 is formed into a disk shape, and is placed on the side of the inner peripheral surface of the transmission ring 11. A connecting portion 13a that connects the drive shaft 2 is provided in one end surface of the hub 13, and the drive shaft 2 is secured to the hub 13 by a nut 13b screwed in the other end surface of the hub 13. A plurality of ball grooves 13c that engage the balls 14 movably in the diametrical direction are provided in the other end surface of the hub 13 in a circumferentially spaced-apart manner, and each ball 14 is circumferentially locked in an inner side surface of the ball groove 13c. In this case, a protrusion 13d protruding axially is provided outside the ball groove 13c in the diametrical direction, and the protrusion 13d axially abuts against the ball 14 placed outside the ball groove 13c in the diametrical direction. An extending portion 13e extending axially in a tubular shape so as to cover the nut 13b is provided in the center in the diametrical direction of the other end surface of the hub 13.

The balls 14 are spaced apart circumferentially of the hub 13, and are placed in the ball grooves 13c of the hub 13.

The pressing ring 15 engages the extending portion 13e of the hub 13 movably in the axial direction, and one end surface of the pressing ring 15 abuts against each ball 14. An inclined surface 15a gradually axially protruding from outside to inside in the diametrical direction is provided in one end surface of the pressing ring 15, and the ball 14 placed outside the ball grooves 13c in the diametrical direction abuts against the outside of the inclined surface 15a in the diametrical direction. A Belleville spring 15b that engages the extending portion 13e of the hub 13 is provided in the other end surface of the pressing ring 15, and the Belleville spring 15b urges the pressing ring 15 toward the ball 14. The Belleville spring 15b is placed in a compressed state between the annular nut 15c that screws over the extending portion 13e and the pressing ring 15, and adjusting a fastening force of the nut 15c allows a pressing force of the pressing ring 15 by the Belleville spring 15b to be freely set.

Figures 4A, 4B:
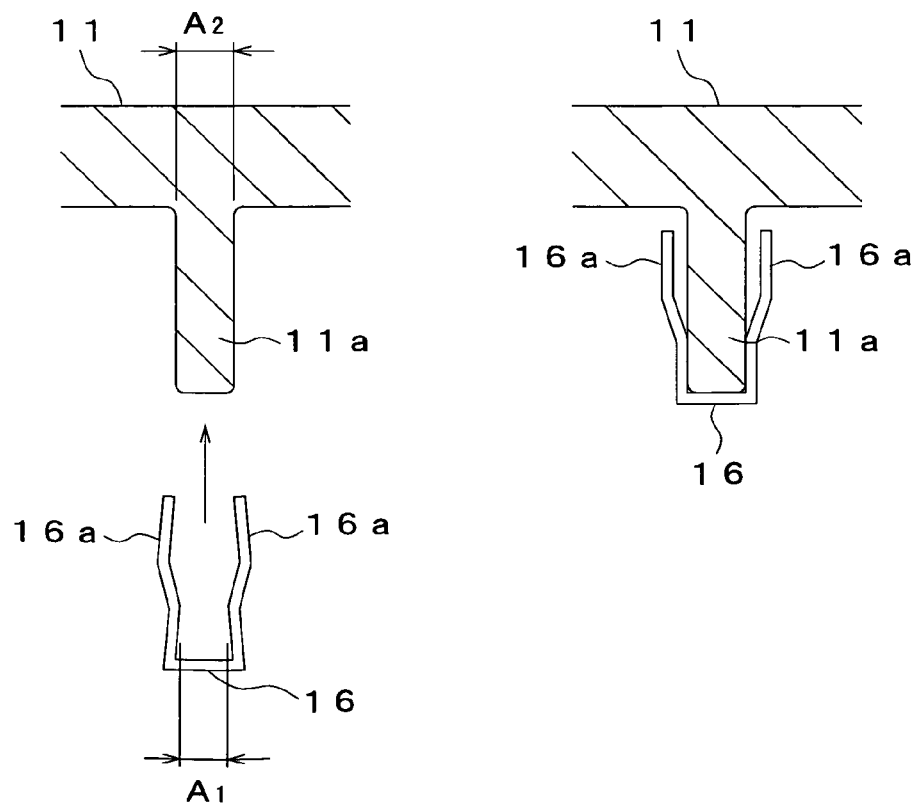
FIGS. 4A and 4B are front views, partially in section, of states of an elastic member before and after engagement.
Figure 6A:
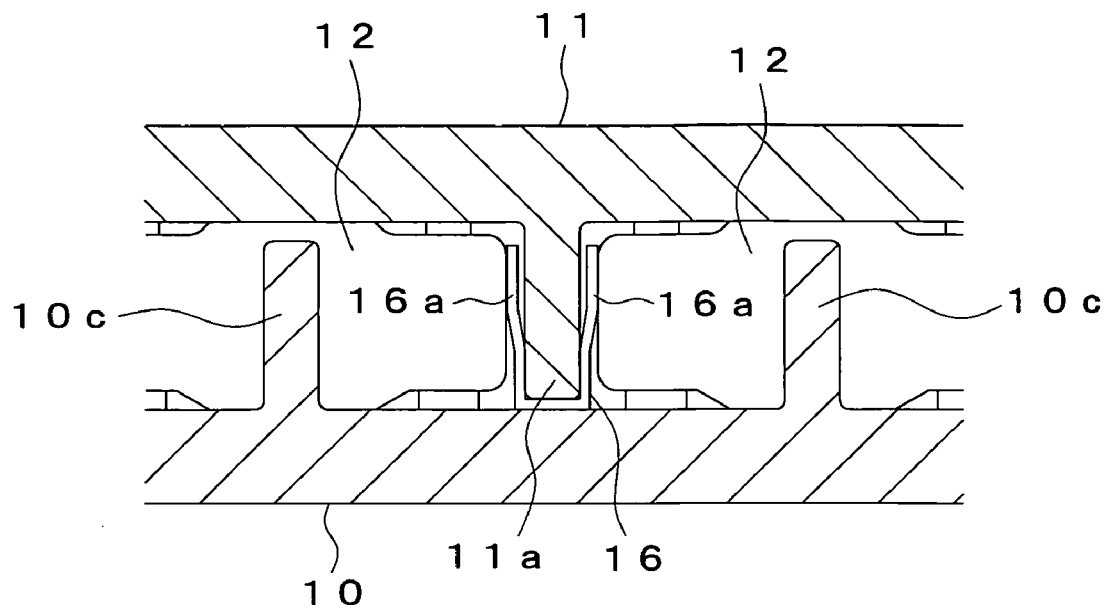
FIGS. 6A and 6B are front views, partially in section, of an operation of the elastic member.

Each elastic member 16 is formed of a metal spring material having opposite ends bent into an L shape, and engages each protrusion 11a of the transmission ring 11. Elastic pieces 16a that are elastically deformable in a width direction are formed in the opposite ends of the elastic member 16, and each elastic piece 16a is placed between the protrusion 11a and the shock absorbing rubber 12. In this case, as shown in FIG. 4, each elastic piece 16a is formed so that part of a tip thereof protrudes more outward in the width direction than part of a base thereof, and a space A1 at the base is slightly smaller than a width A2 of the protrusion 11a. Specifically, as shown in FIG. 4A, when the protrusion 11a is pressed in between the elastic pieces 16a of the elastic member 16, the elastic pieces 16a are spread outward in the width direction by the protrusion 11a as shown in FIG. 4B, the protrusion 11a is sandwiched by elastic forces of the elastic pieces 16a, and the elastic member 16 is held on the protrusion 11a. As shown in FIG. 6A, each elastic piece 16a is placed between the shock absorbing rubber 12 and the protrusion 11a previously in a compressed state so as to be elastically deformed.

In the above described configuration, when the power of an engine is introduced to the pulley 10, the transmission ring 11 rotates integrally with the pulley 10. At this time, the torque of the pulley 10 is transmitted to the transmission ring 11 via each shock absorbing rubber 12, and each shock absorbing rubber 12 is elastically deformed between the protrusion 10c of the pulley 10 and the protrusion 11a of transmission ring 11 to absorb a shock caused by periodical rotation number changes of the engine. The torque of the transmission ring 11 is transmitted to the hub 13 via the locking ring 11b and each ball 14, and the drive shaft 2 rotates together with the hub 13. At this time, each ball 14 is pressed outward of each ball groove 13c in the diametrical direction by the inclined surface 15a of the pressing ring 15, and each ball 14 is circumferentially locked by the taper surface 11c of the locking ring 11b, thereby causing the torque of the transmission ring 11 to be transmitted to the hub 13.

Figure 5A:
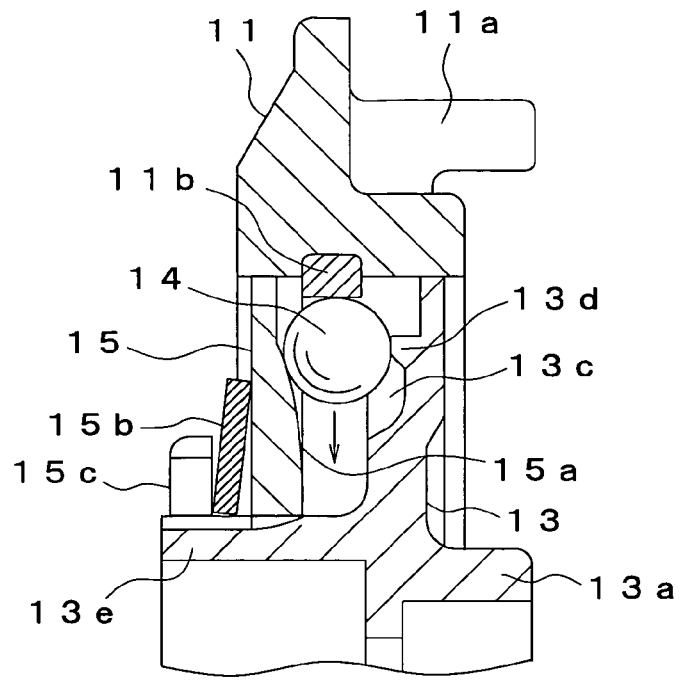
FIGS. 5A and 5B are side sectional views of essential portions of an operation at the time of power interruption.
Figure 5B:
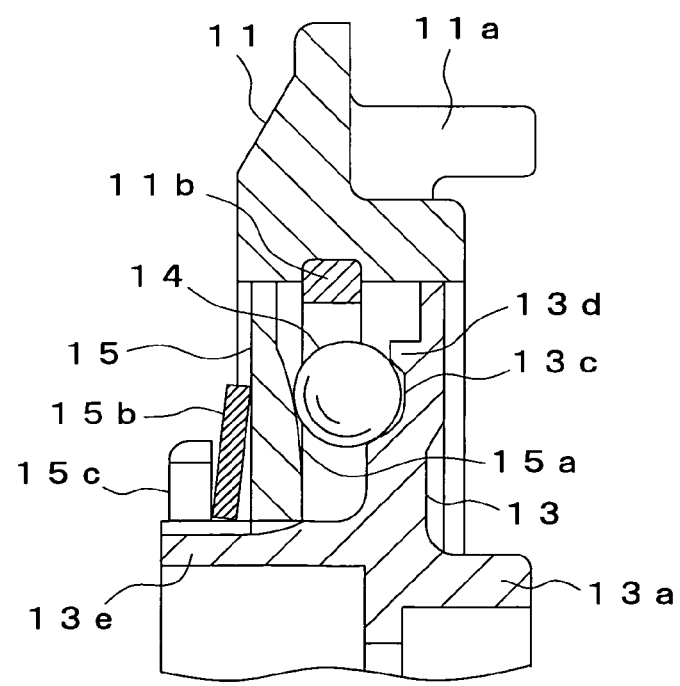

If an excessive rotation load is applied to the pulley 10 because of, for example, seizing of the compressor, the press of the taper surface 11c of the locking ring 11b causes each ball 14 to be moved inward of the ball groove 13c in the diametrical direction against the pressing force of the pressing ring 15 as shown in FIG. 5A. Thus, each ball 14 is held inside the ball groove 13c in the diametrical direction by the protrusion 13d of the ball groove 13c and the pressing ring 15 as shown in FIG. 5B, and the ball 14 is restrained in a position where the ball 14 can not be locked by the locking ring 11b. This causes idling of the transmission ring 11 with respect to the hub 13, and power transmission from the pulley 10 to the drive shaft 2 is interrupted.

Figure 6B:
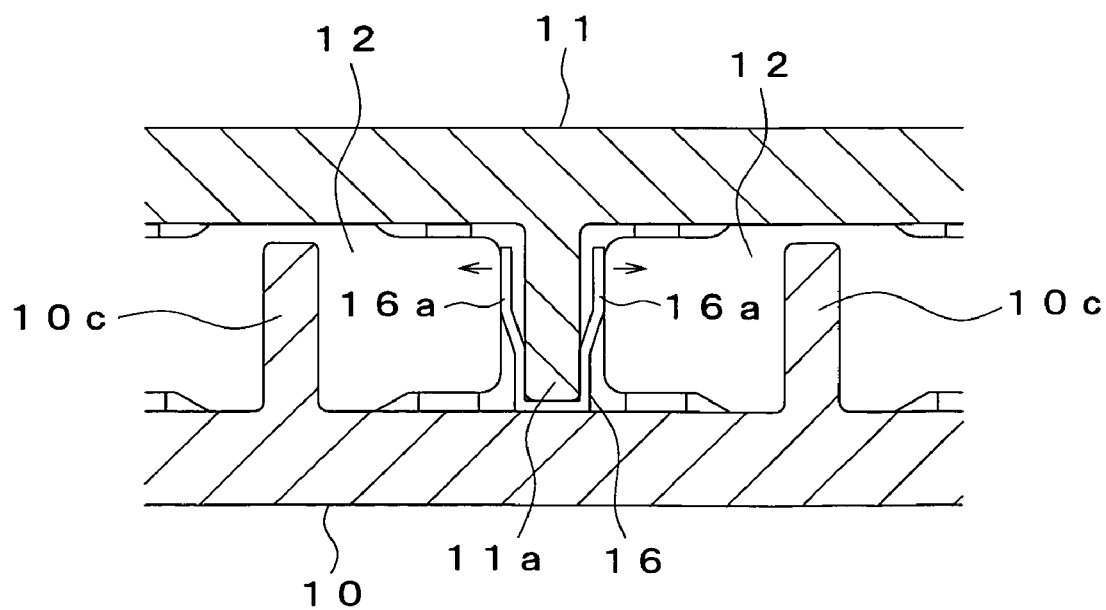
Figure 7:
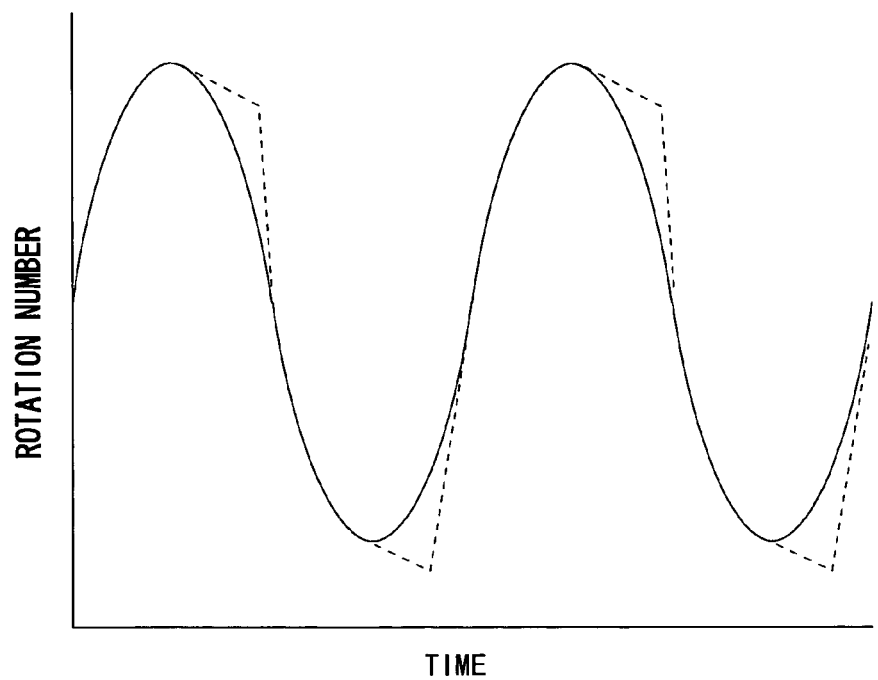
FIG. 7 is a graph showing a relationship between rotation number changes and time.
Figure 7:
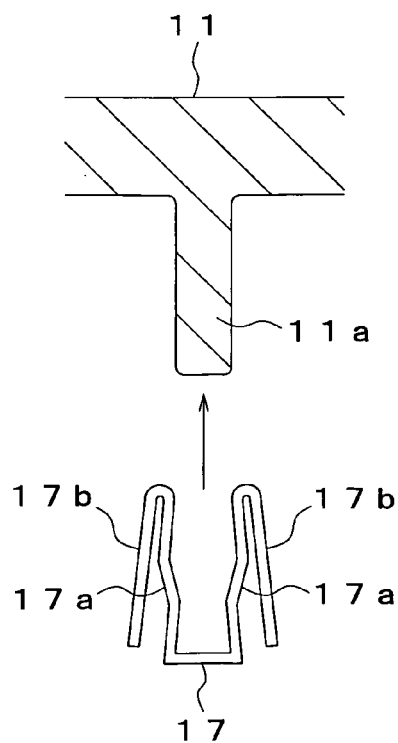
Figure 7:
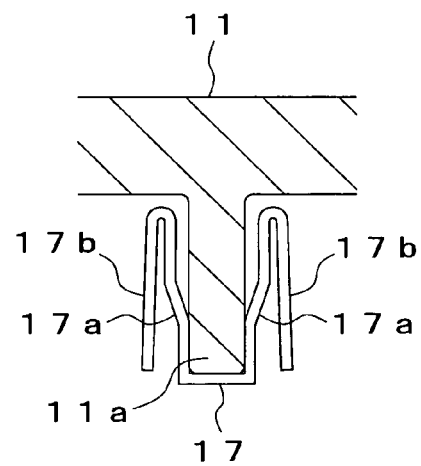

In a normal rotation operation, when the torque of the pulley 10 is transmitted to the transmission ring 11, one of the shock absorbing portions 12a of each shock absorbing rubber 12 is elastically compressed between the protrusions 10c and 11a. Even if compression forces repeatedly applied to the shock absorbing rubber 12 causes the shock absorbing rubber 12 to be permanently deformed in a compression direction, the elastic member 16 placed between the shock absorbing rubber 12 and the protrusion 11a presses the shock absorbing rubber 12 circumferentially of the pulley 10 and the transmission ring 11 as shown in FIG. 6B. Thus, even in the case of the engine or the like where periodical rotation number changes occur as shown by the solid line in FIG. 7, a shock of an abrupt rotation number change caused by rattling between the shock absorbing rubber 12 and the transmission ring 11 is absorbed by the elastic member 16. If a clearance is created between the shock absorbing rubber 12 and the protrusion 11a without the elastic member 16, an inertial force of the transmission ring 11 in a rotation area that is not subjected to shock absorbing action of the shock absorbing rubber 12 causes an abrupt rotation number change with collision between the shock absorbing rubber 12 and the protrusion 11a as shown by the broken line in FIG. 7, thereby causing vibration or collision noise.

Thus, according to the embodiment, even if the shock absorbing rubber 12 is permanently deformed in the compression direction, the elastic member 16 part of which is placed between the shock absorbing rubber 12 and the protrusion 11a presses the shock absorbing rubber 12 circumferentially of the pulley 10 and the transmission ring 11, and therefore, the shock of the abrupt rotation number change caused by the rattling between the shock absorbing rubber 12 and the transmission ring 11 can be absorbed, and vibration in a rotation direction and collision noise can be reliably prevented.

Further, the elastic member 16 is placed between the shock absorbing rubber 12 and the protrusion 11a previously in a compressed state so as to be elastically deformed, and thus even if the shock absorbing rubber 12 is shrunk by permanent deformation, the shock absorbing rubber 12 can be always urged according to the shrinkage, thereby reliably preventing the rattling between the shock absorbing rubber 12 and the transmission ring 11. In this case, the elastic member 16 is preferably formed to have an urging force larger than the inertial force of the transmission ring 11 caused by the abrupt rotation number change.

The elastic member 16 is formed to engage the protrusion 11a, and the pair of elastic pieces 16a that form the opposite ends of the elastic member 16 are abutted against the shock absorbing rubbers 12 placed on both sides of the protrusion 11a. Thus, one elastic member 16 can urge the two shock absorbing rubbers 12 placed on the both sides of the protrusion 11a, thereby reducing the number of components.

In this case, the space A1 at a part between the elastic pieces 16a is slightly smaller than the width A2 of the protrusion 11a, and the protrusion 11a is pressed in between the elastic pieces 16a, thereby allowing the elastic member 16 to be held in engagement with the protrusion 11a and facilitating an assembly operation.

In the embodiment, each elastic piece 16a of the elastic member 16 is placed between the shock absorbing rubber 12 and the protrusion 11a, but an elastic member may be used that is formed to be entirely placed between the shock absorbing rubber 12 and the protrusion 11a.

In the embodiment, a power interruption mechanism is provided that interrupts power transmission between the transmission ring 11 and the hub 13 by moving the ball 14 for power transmission placed between the transmission ring 11 and the hub 13 to a predetermined position when torque higher than a predetermined value occurs between the transmission ring 11 as the driven rotor and the hub 13 as another driven rotor. However, a power interruption mechanism having another configuration may be provided that interrupts power transmission between the transmission ring 11 and the hub 13 by breaking a member for power transmission placed between the transmission ring 11 and the hub 13 when torque higher than a predetermined value occurs between the transmission ring 11 and the hub 13.

FIG. 8 shows another embodiment of the invention, and is a front view, partially in section, of states of an elastic member before and after engagement. Specifically, the elastic member 17 shown in FIG. 8 is formed of a metal spring material as in the former embodiment, and engages each protrusion 11a of a transmission ring 11. A first elastic piece 17a and a second elastic piece 17b that are elastically deformable in a width direction are formed in each of opposite ends of the elastic member 17, and the second elastic piece 17b is formed by bending a tip of the first elastic piece 17a outward in the width direction. In this case, as in the former embodiment, each first elastic piece 17a is formed so that part of the tip thereof protrudes more outward in the width direction than part of a base thereof, and a space at the base is slightly smaller than a width of the protrusion 11a as shown in FIG. 8A.

According to this embodiment, the first elastic piece 17a of the elastic member 17 as well as the second elastic piece 17b can be elastically deformed circumferentially of the pulley 10 and the transmission ring 11, thereby increasing the amount of deformation of the elastic member 17 and increasing a range of absorption of rattling between the shock absorbing rubber 12 and the transmission ring 11.

In the embodiments, the power transmission device for transmitting power to the compressor is shown, but the invention may be applied to a power transmission device used in other rotation devices.

What is claimed is:

1. A power transmission device comprising:
a drive rotor rotated by external power; and
a driven rotor rotated by the drive rotor,
wherein a plurality of protrusions are provided in the drive rotor and the driven rotor so as to be circumferentially spaced apart and axially protrude facing circumferentially each other, a block-shaped shock absorbing rubber being placed between each protrusion of the drive rotor and each protrusion of the driven rotor, and torque of the drive rotor being transmitted to the driven rotor via each shock absorbing rubber,
wherein an elastic member that presses the shock absorbing rubber circumferentially of the drive rotor and the driven rotor is provided between the shock absorbing rubber and the protrusion, a part of the elastic member directly engages the protrusion of the drive rotor or the driven rotor, and another part of the elastic member biases the shock absorbing rubber towards an adjacent protrusion of the drive rotor or the driven rotor,
wherein said elastic member is placed between the shock absorbing rubber and the protrusion previously in a compressed state so as to be elastically deformed and
wherein said elastic member comprises a pair of elastic pieces that abut against shock absorbing rubbers placed on both sides of the protrusion are formed in opposite ends of the elastic member.

2. The power transmission device according to claim 1, wherein a space between said elastic pieces at the part of said elastic member is slightly smaller than a width of the protrusion, and the protrusion is pressed in between the elastic pieces.

3. The power transmission device according to claim 1, wherein said elastic pieces are formed by bending the opposite ends of the elastic member outward in a width direction.

4. The power transmission device according to claim 2, wherein said elastic pieces are formed by bending the opposite ends of the elastic member outward in a width direction.

5. The power transmission device according to claim 1, further comprising a power interruption mechanism that transmits torque of said driven rotor to another driven rotor, and interrupts power transmission between the driven rotors when torque higher than a predetermined value occurs between the driven rotors.

* * * * *